(12) United States Patent  
Scalise et al.

(10) Patent No.: US 9,398,413 B1  
(45) Date of Patent: Jul. 19, 2016

(54) MAPPING ELECTRONIC DEVICES WITHIN AN AREA

(71) Applicant: AMAZON TECHNOLOGIES, INC., Reno, NV (US)

(72) Inventors: Albert M. Scalise, San Jose, CA (US); Tony David, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/218,307

(22) Filed: Mar. 18, 2014

(51) Int. Cl.
*H04W 4/02* (2009.01)
*G06T 11/20* (2006.01)

(52) U.S. Cl.
CPC ............ *H04W 4/023* (2013.01); *G06T 11/206* (2013.01)

(58) Field of Classification Search
CPC ............ G08C 2201/91; H04L 12/2803; H04L 12/2816; H04L 12/2807; H04L 12/2825; H04L 12/283; H04W 4/185
USPC ............................................. 455/457
See application file for complete search history.

(56) References Cited

U.S. PATENT DOCUMENTS

2012/0302219 A1* 11/2012 Vang .......................... 455/414.1
2015/0193971 A1* 7/2015 Dryanovski ............ G06T 17/05
345/419

* cited by examiner

*Primary Examiner* — Kwasi Karikari
(74) *Attorney, Agent, or Firm* — Lindauer Law, PLLC

(57) ABSTRACT

A computing device is used to acquire data and information regarding various electronic devices within a home, commercial space, or another area of interest. Locations for the electronic devices may also be determined by way of a location resource of the computing device, by user input, or through another suitable technique. Various maps may be generated that include graphical representations of the electronic devices, as well as walls, doorways, furniture, or other features within the area or space of interest. A user may amend or add various details within such a map by way of respective user interfaces presented by the computing device. The respective functions and cooperative operations of the electronic devices may be visualized and improved through such mapping.

20 Claims, 11 Drawing Sheets

MAPPING ELECTRONIC DEVICES WITHIN AN AREA

BACKGROUND

Electronic devices are used to perform various respective and cooperative functions. Enhancement of these cooperative operations and expanded device usage opportunities are sought after.

Figure 1:
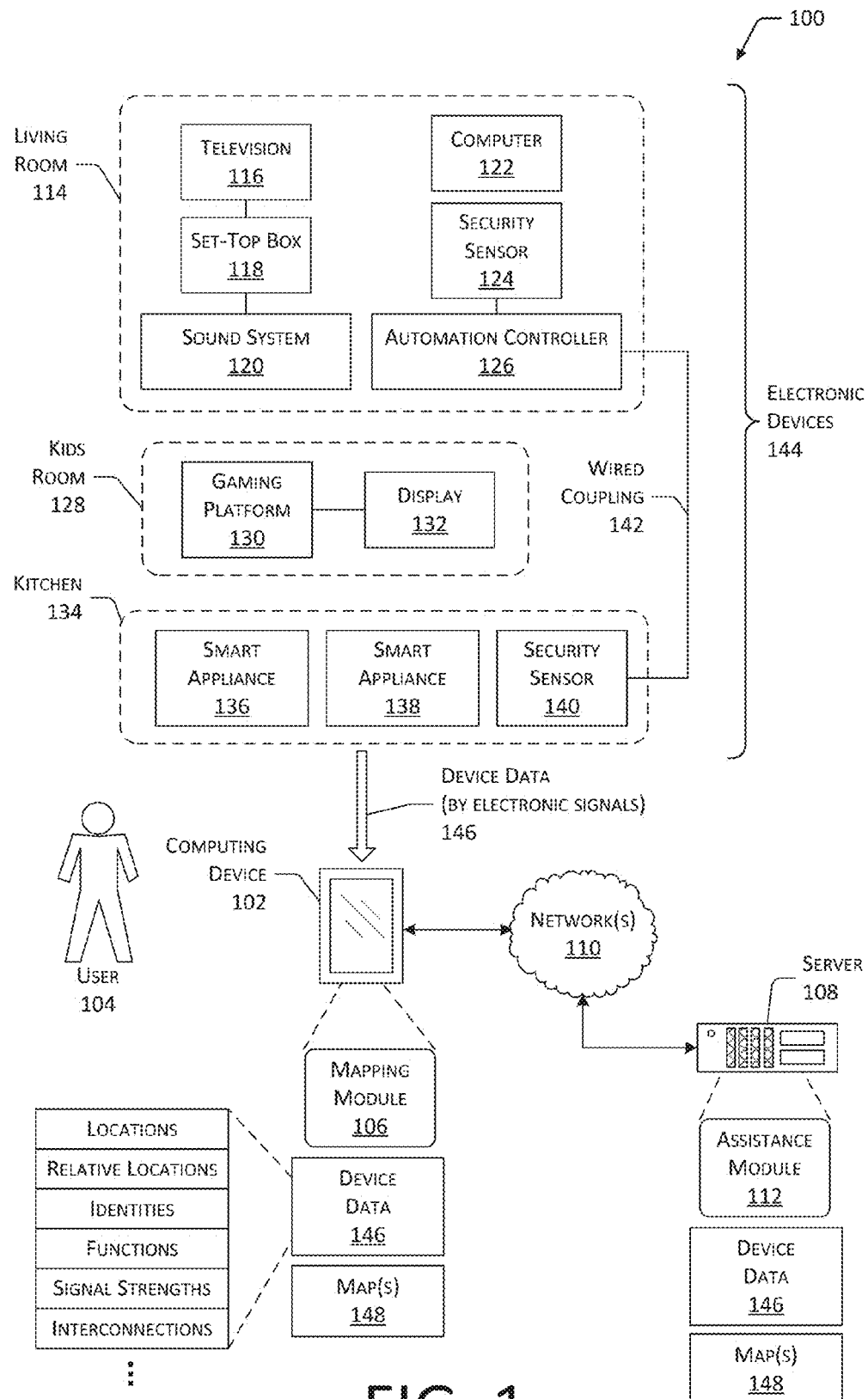
FIG. 1 depicts views including a computing device and a server, and the acquisition of device data from respective electronic devices used for the generation of corresponding maps.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Many different types of electronic devices may be distributed about the inside of a home, office area, or other area or space of interest. Examples of such devices include, but are not limited to, computers, security or fire-protection alarms, home or building automation systems, audio/video or other entertainment electronics, video gaming platforms, smart exercise equipment, smart home appliances, and so forth. Often, two or more respective devices cooperate with one another so as to perform a range of functions or services.

For instance, a television (TV), computer monitor, or other display device may be coupled to a set-top box by way of a high-definition multimedia interface (HDMI) cable. The set-top box may in turn be connected to a receiver or other device, such that audio and video programming may be received by way of satellite-based wireless signaling, and presented on the TV. An audio amplifier or sound system may also be connected to the set-top box by way of HDMI cabling or another wiring protocol, such that enhanced audio presentation is made through multiple speakers arranged relative to the W.

In another example, a home security system may include a control center or "keypad" located near a main door such that a security alarm function may be conveniently activated or inactivated through password entry or other action when persons exit or enter the home. Such a home security system may include motion detectors, window glass-breakage sensors, smoke or toxic gas detectors, or other instruments distributed about the home and in communication with the control center or each other by way of wireless signaling. In another instance, such instruments and the control center communicate with each other by way of wired connections in the interest of tamper-resistant security. The wired connections may include electrical conductors, optical waveguides, radio frequency waveguides, and so forth.

Often, a homeowner or other user makes use of various functions that are performed by the respective electronic devices within their home. Additionally, such a user may be aware of, or has established, some number of cooperative operations that are performable between two or more of the electronic devices, such as audio/video signal sharing between the set-top box and their sound system, verifying that the security control center is in communication with all of the smoke detectors or intrusion sensors, and so forth. Thus, the user is aware of numerous respective operations and cooperative operations that their electronic devices may perform.

However, many such users are often unaware of certain capabilities or functions that may be performed by a particular electronic device as it was originally designed. For instance, a user may not be aware that their TV has an automatic timer that will turn the TV off on a time-of-day or period-of-use basis. Such a TV may be programmed to turn itself off, for example, at 1:00 AM thus saving energy in the event that a user has fallen asleep while watching a program late at night.

A user may also be unaware of various cooperative operations or functions that two or more of the electronic devices are intended to offer or perform. For instance, the user may have their home automation system configured to adjust the temperature set point of their heating system based on time-of-day, un-occupancy due to a family vacation, or in accordance with other criteria. However, the user may not know that their home automation system is also configured, by original design, to turn a television or sound system on and off in the interest of presenting an occupied appearance to would-be burglars. Such control actions may be affected by way of wireless signaling capabilities or protocols that the home automation controller, the TV, and the sound system share in common.

Additionally, there may be a range of functions or cooperative operations that respective electronic devices can perform, not as a part of their original designs, but by virtue of signaling, upgrades to computer program code, or other resources. For example, various instruments within a home security system may communicate with each other by way of encrypted data packets communicated by way of wireless signals. Such wireless signals may include those in accordance with the Institute of Electrical and Electronics Engineers (IEEE) standard 802.11, Wi-Fi™, or other protocols such as such as Bluetooth® or Zigbee®. A laptop computer having wireless capabilities in accordance with the same protocol as the home security system may also be present in the home.

Accordingly, a processor-executable program code or "software" upgrade may be installed in the laptop computer such that communication with the home security system is enabled. For instance, the laptop computer may be provided with one or more encryption schemes or keys, signal or packet processing methodologies, a user interface, or other resources such that the laptop computer can present security system status information to a user. Alarm system testing, wireless signal strength measurements, changing or managing user passwords, viewing access or egress time logs, or other operations may be performed using conveniences made possible on the laptop computer, which may not be provided by the "keypad" of the home security system.

In one illustrative operation, a user may use a suitable computing device, such as a tablet computer or other portable apparatus, to survey the various electronic devices within their home, office, or other space. Such a survey may include determining relative or geographical locations for each of the devices, acquiring identifying or functionality information from each device, determining various wired or wireless signal capabilities for the respective devices, and so on. Once devices have been identified and located, a data structure may be populated with the corresponding information. Additional information may also be obtained for respective ones of the devices by way of Internet-based resources, servers, or other network-based entities. Benchmark locations or other information corresponding to a perimeter shape, wall or doorway locations, or other characteristics of the relevant space may also be acquired.

Data regarding the electronic devices, their respective or relative locations, and objects or characteristics within the area of interest may be used to generate a corresponding map. The map, which is a dataset regarding an area or space, may include or plot default icons representing the electronic devices, which may thereafter be replaced with user-selected icons from a database. Alternatively, particular icons may be obtained from various Internet and network-based resources, or obtained by communication with respective devices, without user intervention—thus, in a substantially automatic manner—and used within the map.

Continuing the illustration, the map may visibly represent the area of interest, the various devices, features such as walls, doorways, stairs, or other objects or characteristics as a plan view, an isometric or perspective view, or as other two- or three-dimensional representations. Other data or information may also be included in, or presented by, such a map or maps. One or more user interfaces may include a listing of the electronic devices, provide tools for a user to add or amend information regarding the respective electronic devices, and so on. Such a user interface may also provide user assistance or guidance toward the addition of electronic devices to the listing, which were not found during a previous discovery operation.

The resulting visible representations of the map or maps may be used to identify other electronic device placement opportunities, expose new cooperative uses or operations between respective devices, and so forth. For instance, a user may have desktop computer within a home office located on the second floor of their home. The user may also note, through observation of the map, that an intrusion detector of the home security system senses an open or closed condition of the front door, which is located on the first floor. The user further observes that both the home security system and the desktop computer have Wi-Fi™ signaling capability, such that it may be possible to provide a visible or audible indication at the computer when someone opens the front door.

Such an annunciator-type application may be useful so as to alert the user to family members entering or leaving the home, warn the user of a possible intrusion, and so forth, without having to arm the security system or trigger unwanted alarms. In such a case, the user may then access a website of the vendor or manufacturer of the home security system, perform a general Internet search, or take other action toward finding and installing such an annunciator application. Other new uses for or cooperative operations between the respective electronic devices in a home, commercial space, or other area may also be implemented by way of such device discovery and mapping. Respective variations on the foregoing may also be used in accordance with the methods, devices, and systems described herein.

FIG. 1 depicts views 100 including particular elements and operations performed by each. The views 100 are illustrative and non-limiting in nature, and other elements, devices, systems, or respective operations are also contemplated.

A computing device 102 is depicted as a tablet computer. Numerous other types of computing devices 102, such as wearable computers, smart phones, laptop computers, e-book readers, media devices, and so on, may also be used. The computing device 102 is associated with and operable by a user 104.

The computing devices 102 may include a mapping module 106. The mapping module 106 may be configured to perform numerous different operations or functions toward discovering, locating, or mapping electronic devices, or respective combinations of these or other functions. The mapping module 106 may include electronic circuitry, one or more hardware processors, one or more data structures or program code stored on non-transitory computer-readable storage media (CRSM), or other resources or constituency.

The mapping module 106 or other aspects of the computing device 102 may be configured to communicate with a server 108 by way of one or more networks 110. The network or networks 110 may include a local-area network (LAN), a wide-area network (WAN), the Internet or connection thereto, and so forth. Other networks 110 may also be used. In turn, the computing device 102 may be respectively connected to the network(s) 110 by way of wired, wireless, optical, or other signaling types or protocols, or by a combination of two or more of these techniques.

The server 108 may include various resources, such as an assistance module 112. The assistance module 112 may include electronic circuitry, one or more hardware processors, one or more data structures or program code stored on non-transitory CRSM, and so forth. The assistance module 112 may include other respective resources, elements, or constituency, as well. The assistance module 112 may be configured to perform one or more functions related to discovery, locating, or mapping analogous to those of the mapping module 106, as well as other operations or functions.

Also depicted is a living room 114. The living room 114 is an area of interest within a home, apartment, or other domestic dwelling, having respective devices located therein. A television 116, a set-top box 118, and a sound system 120 perform respective functions, and are coupled to each other by way of HDMI or other wired connections. The wired connections may couplings made using electrical conductors, optical waveguides, radio frequency waveguides, and so forth. For example, the wired connection may include a fiber optic cable, copper wiring, and so forth.

Various operations may therefore be performed by way of the television 116, the set-top box 118, and the sound system 120 in accordance with this cooperative operation. A cooperative operation may be performed when a plurality of devices may, at least partially, interoperate with one another to perform a function or accomplish a goal. For instance, digital audio signaling may be received from a remote source by the set-top box 118, and communicated to the sound system 120 for conversion to analog format, power amplification, and distribution to respective speakers. In another instance, the television 116 may receive a channel-change command from a remote control device, and communicate a corresponding command to the set-top box 118. The set-top box 118 responds by switching a digital video signal feed to the television 116 in accordance with the desired channel.

The living room 114 also includes a computer 122, a security sensor 124, and an automation controller 126, which provide respective functions and capabilities. For instance, the computer 122 may perform various operations by way of respective applications or program codes, communicate with other devices by wired or wireless signaling, and so forth. In turn, the security sensor 124 is configured to detect motion of people within the living room 114 and provide a corresponding signal to the automation controller 126, which may respond by turning room lighting on or off, or adjusting a temperature set point for heating or cooling, or perform other operations. Other respective functions may also be performed, or other cooperative operations may be established and used.

Also depicted is a kids' room 128, which is also an area of interest within the home. The kids' room 128 includes a gaming platform 130 and a display 132, as respective entities located therein. The gaming platform 130 is coupled to the display 132 so as to communicate digital video and audio signaling thereto, for presentation during playing of a video game. The gaming platform 130 and the display 132 may perform other respective functions, as well.

Further depicted is a kitchen 134, also an area of interest within the home. The kitchen 134 includes a smart appliance 136, such as a range/oven combination, and a smart appliance 138, such as a refrigerator having an electronic display supported on a door. The kitchen 134 further includes a security sensor 140, which is configured to detect motion of people within the kitchen 134 and provide a corresponding signal to the automation controller 126 by way of a wired coupling 142. The eleven entities 116-126, 130-132, and 136-140 collectively define electronic devices 144.

Each of the electronic devices 144 may be defined by respective device data 146. The device data 146 may include makes and model numbers, serial numbers or other identifiers, functions or cooperative operations, wired or wireless signaling protocols, or other information respective to each of the electronic devices 144. In one instance, the device data 146 or elements thereof for a particular electronic device 144 may be acquired by way of deliberate wired or wireless communication with the computing device 102.

In another instance, the computing device 102 may use a wireless resource to monitor for beacon signals or other wireless transmissions over a period of time, and identify particular electronic devices 144 by analysis of these signals. Direct communication may be performed or attempted thereafter in regard to electronic devices 144 that are identified or discovered in this way. In still another instance, device data 146 or elements thereof for a particular electronic device 144 may be input to a user interface. In yet another instance, device data 146 or elements thereof may be acquired from the server 108 or another resource connected to the network(s) 110, based on a serial number, make-and-model, or other identifying information. The device data 146 may then be stored within non-transitory CRSM of the computing device 102 as device data 146.

As depicted, the device data 146 may include absolute locations, locations relative to other electronic devices 144, identities, functions, measured wireless signal strengths, interconnections such as cabling formats, or other information with respect to each of the electronic devices 144. The respective elements of the device data 146 may be acquired by the respective techniques described above, or in other suitable ways.

The mapping module 106 may access the device data 146 and generate one or more maps 148. For example, the maps 148 may comprise data representing the living room 114, the kids' room 128, or the kitchen 134, or a graphical representation including some or all of these. The mapping module 106 may include in the maps 148 respective icons representing the electronic devices 144 and visible objects representing other features in the area or volume being mapped. The visible objects are graphical elements representing features such as furniture, architectural elements such as walls, doorways, windows, stairways, light fixtures, and so forth. The visible objects may be automatically determined, or may be selected in accordance with user 104 input. The mapping module 106 may store the one or more maps 148 within non-transitory CRSM of the computing device 102. Additionally, the mapping module 106 may be configured to generate visual representations of the maps 148. For example, these visual representations may include plan views, isometric or perspective views, two- or three-dimensional representations of a room or area, two- or three-dimensional representations of respective electronic devices 144, and so forth. Respective maps 148 may include textual content, graphical elements or objects, symbolic representations, and so forth. Other suitable data, graphical elements, or other content may also be included. A two-dimensional representation may include graphical objects having a "flat" appearance, such as electronic devices, furniture, structural elements such as stairways or doorways, or other things located within an area. Plan views or elevations are examples of two-dimensional representations. In turn, a three-dimensional representation includes graphical objects or features having the appearance of "depth" or thickness by virtue of rendered images. Isometric views are suggestive of three dimensions, while perspective views use "vanishing points" or other techniques to suggest depth or thickness of the objects portrayed therein.

Display devices having three-dimensional capability may be used to present various three-dimensional maps 148, or two-dimensional views of the three-dimensional maps 148. For instance, a user 104 may tour or move through such a three-dimensional map 148 as a "walk-through" or similar presentation, including different levels or floors, resulting in a more meaningful or insightful impression of the size or orientation of electronic devices 144, objects, and architectural features within the depicted space. Two-dimensional maps 148 may be presented using conventional computer monitors and give a user 104 a "bird's eye" or overhead perspective of the relative locations and sizes of objects and features depicted within an area.

The server 108 may include the device data 146 or portions thereof, or one or more of the maps 148, stored within non-transitory CRSM. The device data 146 may be communicated from the computing device 102 to the server 108, or vice-versa. In turn, the maps 148 may be communicated from the computing device 102 to the server 108, or vice-versa. Additionally, one or more of the maps 148 may be generated by the assistance module 112, by way of accessing device data 146 stored within the server 108. Other operations may also be performed.

Figure 2:
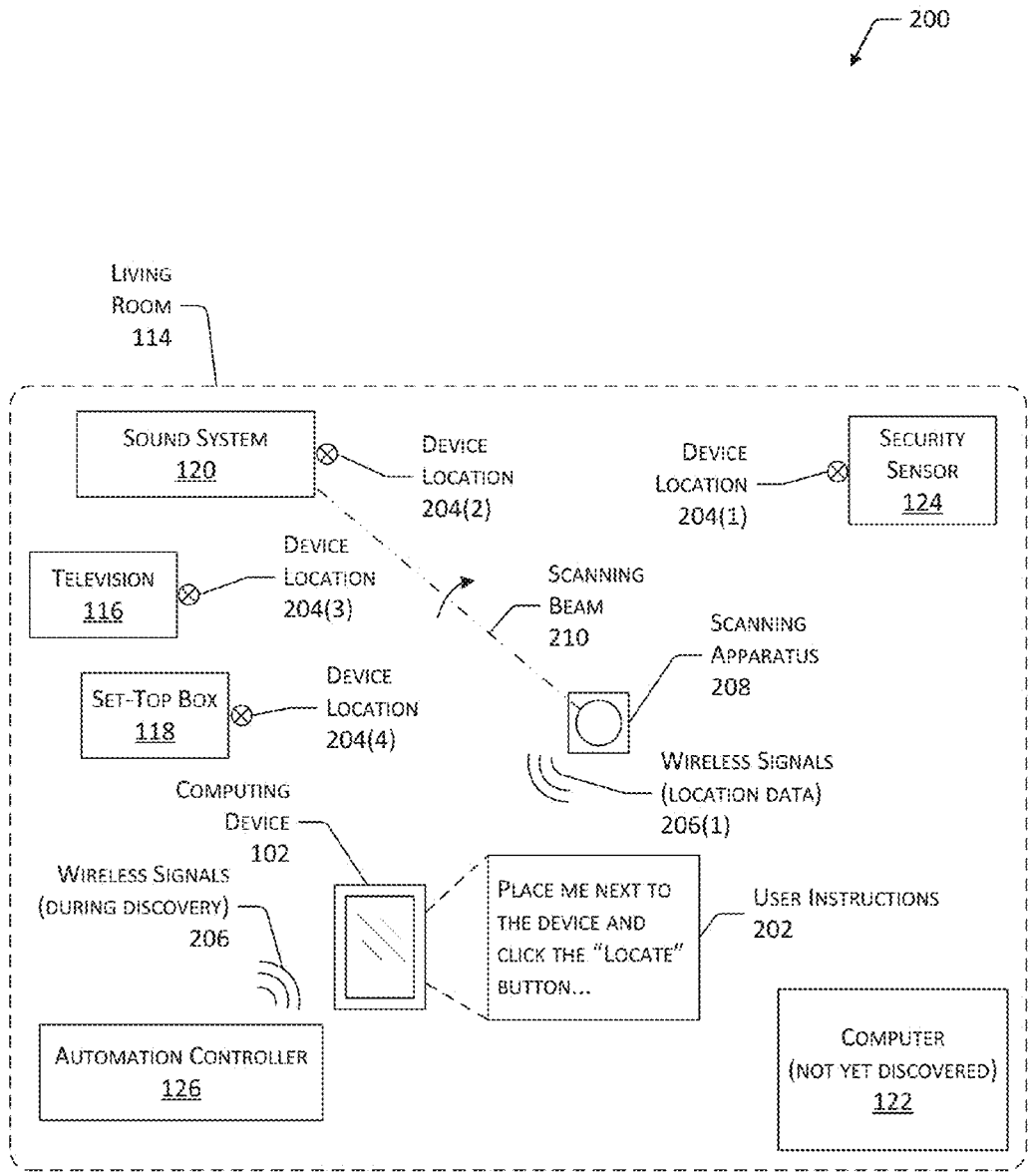
FIG. 2 depicts views including discovery of electronic devices and acquisition of device data using the computing device and electronic signaling.

FIG. 2 depicts views 200 including an illustrative operation of determining the locations of respective electronic devices 144 within the living room 114. The views 200 are non-limiting in nature, and other elements, devices, items, or respective operations are also contemplated.

As depicted, the mapping module 106 of the computing device 102 may present user instructions 202 to guide the user 104 during the discovery or surveying of respective electronic devices 144 within the living room 114. The user instructions 202 may provide information regarding various steps or techniques, hints on how to find or understand device data 146 provided by a "boiler plate" on an electronic device 144, instructions regarding one or more tools or user interfaces presented with the user instructions 202, and so forth.

Such discovery or survey operations may include determining locations of the electronic devices 144, as well. For instance, the user 104 may place the computing device 102 proximate to the security sensor 124 and actuate a "locate" button or soft switch presented as part of the user instructions 202. The computing device 102 responds to this actuation by determining a location of the computing device 102 at about the time of the actuation. The computing device 102 may determine its location by way of inertial navigation referenced to a known base point, radio signals, image data acquired from a camera, or in accordance with another suitable technique. For example, the computing device 102 may include a global positioning system (GPS) receiver or other radio-navigation device. Given the proximity of the computing device 102 to the security sensor 124 (or other object to be placed on the map 148), the location of the computing device 102 at the time of actuation may be assigned to a device location 204(1) associated with the security sensor 124. Locations corresponding to features such as furniture, walls, stairways, other architectural elements, and so on, within an area or space of interest may also be determined using the computing device 102 in this fashion.

The device location 204(1) may then be stored in CRSM of the computing device 102 along with identifying information or other device data 146 corresponding to the security sensor 124. Once the device location 204(1) has been determined, the user 104 may walk through the living room 114, using the computing device 102 to determine device locations 204(2), 204(3), and 204(4) for the sound system 120, the television 116, and the set-top box 118, respectively. These respective device locations 204(2)-204(4) may also be stored, along with corresponding device data 146, within non-transitory CRSM of the computing device 102.

The mapping module 106 may also acquire device data 146 for respective electronic devices 144 by way of wired or wireless communication. As depicted, the mapping module 106 may establish communication with the automation controller 126 by way of wireless signals 206, such as in accordance with Bluetooth® signaling protocol. The mapping module 106 may then interrogate the automation controller 126 so as to determine a make or model number, a serial number or other identifier, respective functions or cooperative operations that the automation controller 126 may perform, and so on. In one instance, a particular electronic device 144 may have resources configured to determine the location of the particular electronic device 144. For example, the automation controller 126 may determine its own location by way of cellular signal triangulation, and communicate corresponding information to the computing device 102 by way of wireless signals 206. Other locating techniques may also be used.

Device data 146 regarding the automation controller 126 may be stored within the computing device 102, may be communicated to the server 108, or used for other purposes. The mapping module 106 further operates to determine a device location 204 for the automation controller 126, which is stored as part of the device data 146 within the computing device 102 or the server 108, or both. Other kinds of information may also be acquired by wireless signals 206 communication between the computing device 102 and the automation controller 126.

In another instance, a scanning apparatus 208 may scan the living room 114 by way of a scanning beam 210. The scanning beam 210 may be a laser beam or other light that is swept about in two axes so as to illuminate the interior of the living room 114. For example, an infrared laser may be configured to scan and illuminate the area in a predetermined pattern. A detector of the scanning apparatus 208 receives reflected light or fluoresced light from physical objects within the living room 114, such as electronic devices 144, features, and so on. For example, an imaging array such as a complementary metal oxide semiconductor coupled to a lens system may acquire the reflected or fluoresced light. The dimensions and interior volumetric shape of the living room 114 also be determined using information such as time of flight, angular displacement, and so forth. For example, the scanning apparatus 208 may generate point cloud data. Wireless signals 206(1) may communicate corresponding data, such as the point cloud data, to the computing device 102, where the data is analyzed such that living room 114 dimensions, feature or electronic device 144 identities, respective device locations 204, and so forth, are determined.

In one example, the scanning apparatus 208 may be configured to identify one or more of the electronic devices 144 within the living room 114, and communicate such information by way of the wireless signals 206(1). Distances to or between respective objects or features, or their respective orientations, may be determined by time-of-flight, intensity of reflected or fluoresced light, interferometry, or other processes performed by the scanning apparatus 208. The scanning apparatus 208 may then be moved to another room or area of interest, and the scanning process repeated, and so on, until the entirety of a home or other space has been scanned. Other operations may also be performed. The scanning apparatus 208, or an analogous scanning device, may be rented or loaned for a temporary time from a commercial entity, thus sparing a consumer user 104 the expense of purchasing such an instrument. In yet another instance, a scanning device may be used that employs: sonar or acoustic energy; one or more cameras; sensing within the infrared, visible, or ultraviolet regions of the electromagnetic spectrum; structured light, optical or radio frequency (RF) transducers; or other instrumentation to scan or image an interior space and the respective objects and features therein. This information may then be communicated to the computing device 102. In one example, digital images or renderings of the contents of a room or rooms may be used in generating one or more maps 148, which may thereafter be visibly presented to the user 104.

In another example, digital images or photographs taken within an area of interest by an imaging device may be used to generate or augment various data within a map or maps 148, determine spatial locations or distances between respective electronic devices 144 or features within an area, and so on. For instance, an imaging device may be used to generate a plurality of digital images or frames that include or "capture" images of respective electronic devices 144, furniture, walls or other architectural features, and so forth. The digital images may then be processed or analyzed, using an object recognition resource or other capability of the mapping module 106, so as to identify the respective electronic devices 144 or other objects. The object recognition resource may utilize techniques such processing the digital images with genetic algorithms which have been trained to recognize objects. Other techniques such as scale-invariant feature transform, speeded up robust features detection, geometric hashing, and so forth may also be used. In some implementations a plurality of techniques may be used in conjunction with one another to perform the object recognition.

Angular separation or other techniques may be used to determine or estimate respective spatial or relative locations, estimate distances to or between objects, and so on. For example, digital images acquired from different points in space may be combined to provide for stereovision and acquisition of depth information about placement of physical objects in the field of view of the images. Device locations 204, the relative locations of walls or other features, or other data regarding an area of interest may then be determined or derived through such analysis.

Other operations performed by way of room or area scanning, digital imaging, or other techniques may also be used. In another case, the computing device 102 determines identities, locations, or other information for respective electronic devices 144 by way of scanning or sensing radio frequency identification (RFID) tags or devices borne by the electronic devices 144.

Once discovery, locating, geolocating, or interrogation of the automation controller 126 is complete, the user 104 may advance on to the computer 122. A corresponding device location 204, as well as device data 146, may be determined and acquired for the computer 122 by operations analogous to those described immediately above. Other operations, such as manual entry of device data 146 by the user 104, and so on, may also be used. Thus, device data 146, including locations 204, may be acquired for the respective electronic devices 144 within the living room 114 and stored within the computing device 102. The mapping module 106 may thereafter access the stored device data 146 so as to generate one or more maps, present information to the user 104 by way of one or more user interfaces, acquire other information regarding the electronic device 144 by way of an Internet search, and so forth.

Additionally, wireless signals 206 emanating from one or more of the electronic devices 144 may be sensed by a corresponding resource of the computing device 102 and used to discover or determine relative locations for those electronic devices 144. For instance, the mapping module 106 may include electronic circuitry or other constituency configured to passively "listen" for such wireless signals 206 during respective communications, beaconing, or other operations. Such detected wireless signals 206 may therefore be used as part of a discovery process, as well as to determine general or relative locations by way of triangulation, time-of-flight, time-of-arrival, or other locating techniques based on wireless signaling 206.

Figure 3:
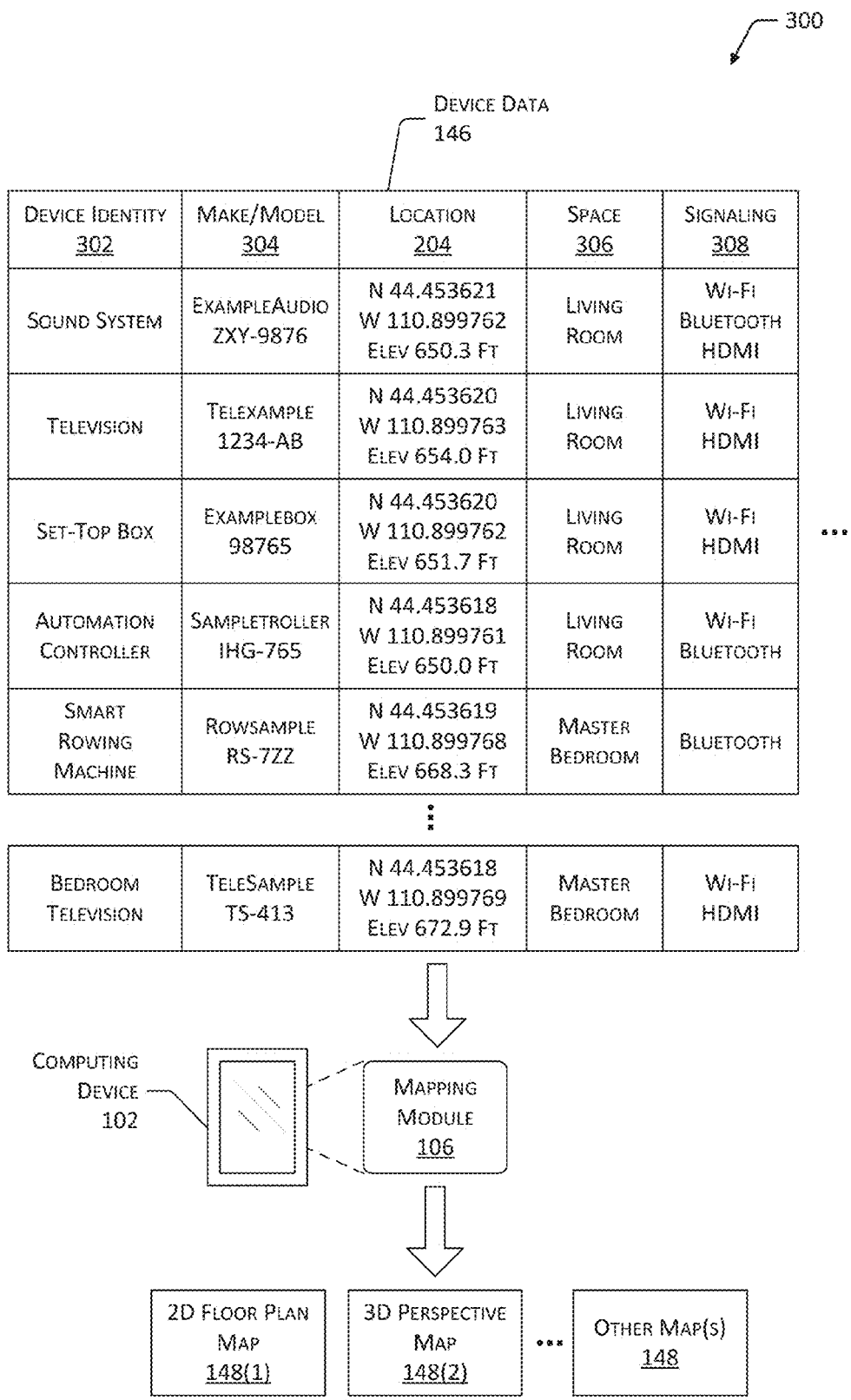
FIG. 3 depicts views including illustrative device data and the usage of that data to generate respective maps.

FIG. 3 depicts views 300 including elements regarding device data 146 and the generation of respective maps by operation of the mapping module 106. The views 300 are non-limiting in nature, and other elements, devices, items, or respective operations are also contemplated.

Illustrative device data 146 is depicted as a table, wherein each row includes information or data corresponding to a particular electronic device 144. Additionally, the table is defined by respective information types, including device identity 302, make/model 304, location 204, space 306, and signaling 308, arranged as respective columns of the table.

For instance, a row of the device data 146 corresponds to the sound system 120, and includes a device identity 302 of "Sound System", a make/model 304 of "ExampleAudio ZXY-9876", a space 306 of "Living Room", and signaling 308 types of "Wi-Fi™, Bluetooth®, and HDMI". The device data 146 for the sound system 120 also includes a location 204 provided as a latitude of "N 44.453621" degrees, a longitude of "W 110.899762" degrees, and an elevation of "650.3 feet", as respectively determined by a GPS receiver of the computing device 102. Other suitable location 204 formats may also be used. Other rows of the device data 146 include information corresponding to the television 116, the set-top box 118, the automation controller 126, and so forth. The depicted information types and particular elements of the device data 146 are illustrative and non-limiting, and other types of data may also be included or used.

As depicted, the device data 146 may be accessed by the mapping module 106 and used to generate a two-dimensional floor plan map 148(1), a three-dimensional perspective map 148(2), or one or more other maps 148 The map 148 comprises a data structure storing information indicative of locations of the electronic devices 144. The map 148 may include location information about other features, information or tags configured to provide particular visible representations or "icons" of respective electronic devices 144, location information about features such as walls, doorways, windows, furniture or fixtures, staircases, electrical outlets or interconnecting wiring access points, light fixtures, or other details or features of an area of interest. The location information stored in the map 148 may be expressed in two- or three-dimensions.

In one instance, one or more of the maps 148 include data that correspond to a habitable dwelling space, such as a house or apartment. In another instance, one or more of the maps 148 correspond to a commercial or industrial space. Other areas of interest, and their respective features and electronic devices 144, may also be mapped. In yet another instance, one or more of the maps 148 include, or are augmented by, data corresponding to digital images or photographs acquired by way of a scanning or imaging device. The information contained in the map 148 may be used to generate a visual representation of the information contained therein which is visually meaningful to the user 104. The map 148 may be communicated to another entity, such as the server 108.

Figure 4:
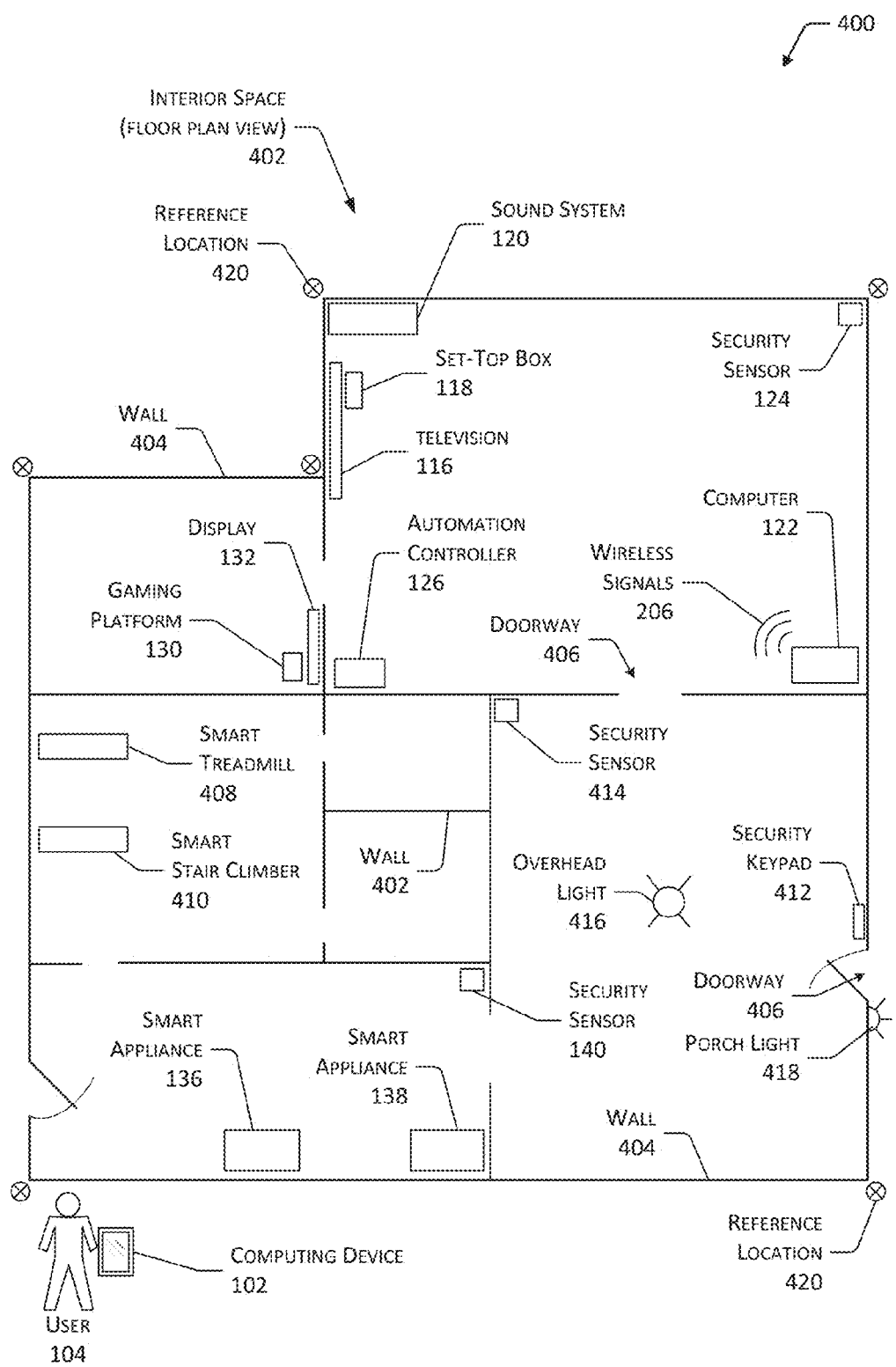
FIG. 4 depicts a plan view of an illustrative dwelling space with electronic devices and interior features represented therein.

FIG. 4 depicts views 400 including an interior space 402 of a domestic dwelling. The views 400 are non-limiting in nature, and other elements, features, process steps, items, or respective operations are also contemplated.

The interior space 402 is characterized by respective walls 404 and doorways 406. In another instance, other objects or structural features may also be depicted. Also depicted are the television 116, the set-top box 118, the computer 122, the security sensor 124, the gaming platform 130, the display 132, the smart appliances 136 and 138, and the security sensor 140. Further depicted are a smart treadmill 408, a smart stair climber 410, a security keypad 412, and a security sensor 414, which define additional electronic devices 144. The interior space 402 may also have features that are controlled by way of the automation controller 126, such as an overhead light 416 or a porch light 418, which are controlled by way of wired or wireless signaling 206. For instance, the automation controller 126 may be programmed or configured to turn the overhead light 416 on and off according to occupancy detected by the security sensor 414. In another instance, the automation controller 126 may turn the porch light 418 on and off according to a time-of-day schedule. Other operations may also be performed.

Further depicted are respective reference locations 420. Each reference location 420 corresponds to a location point about the interior space 402, such as a corner location defined by respective walls 404. Thus, a general perimeter for the interior space 402 may be defined by the reference locations 420 in a "connect-the-dots" manner. The respective reference locations 420 may be determined using the computing device 102, by virtue of a locating device such as a GPS receiver, an inertial navigation device, or other suitable resource.

For instance, the user 104 may walk to a point of interest, such as a corner defined by respective walls 404. The user 104 may then use the computing device 102 to determine a location for that point by way of GPS or another resource, such that a particular reference location 420 is determined. The coordinates or other data describing the reference location 420 may then be stored in non-transitory CRSM of the computing device 102. This process may then be repeated such that a plurality of reference locations 420 is determined and the corresponding location data is stored within the computing device 102. As depicted for illustration, a total of six reference locations 420 are determined about the perimeter of the interior space 402. Other numbers of reference locations 420 may be used in accordance with other circumstances.

The mapping module 106 may then access the data describing the reference locations 420 and generate a 2D floor plan map 148(1) that may be rendered to include visible representations of walls 404 defining an exterior shell of the interior space 402. Thus, the reference locations 420 may provide initial information toward generating a map 148, wherein device locations 204 and other device data 146 and may be used to plot additional details and visible representations in the 2D floor plan map 148(1) thereafter.

Figure 5:
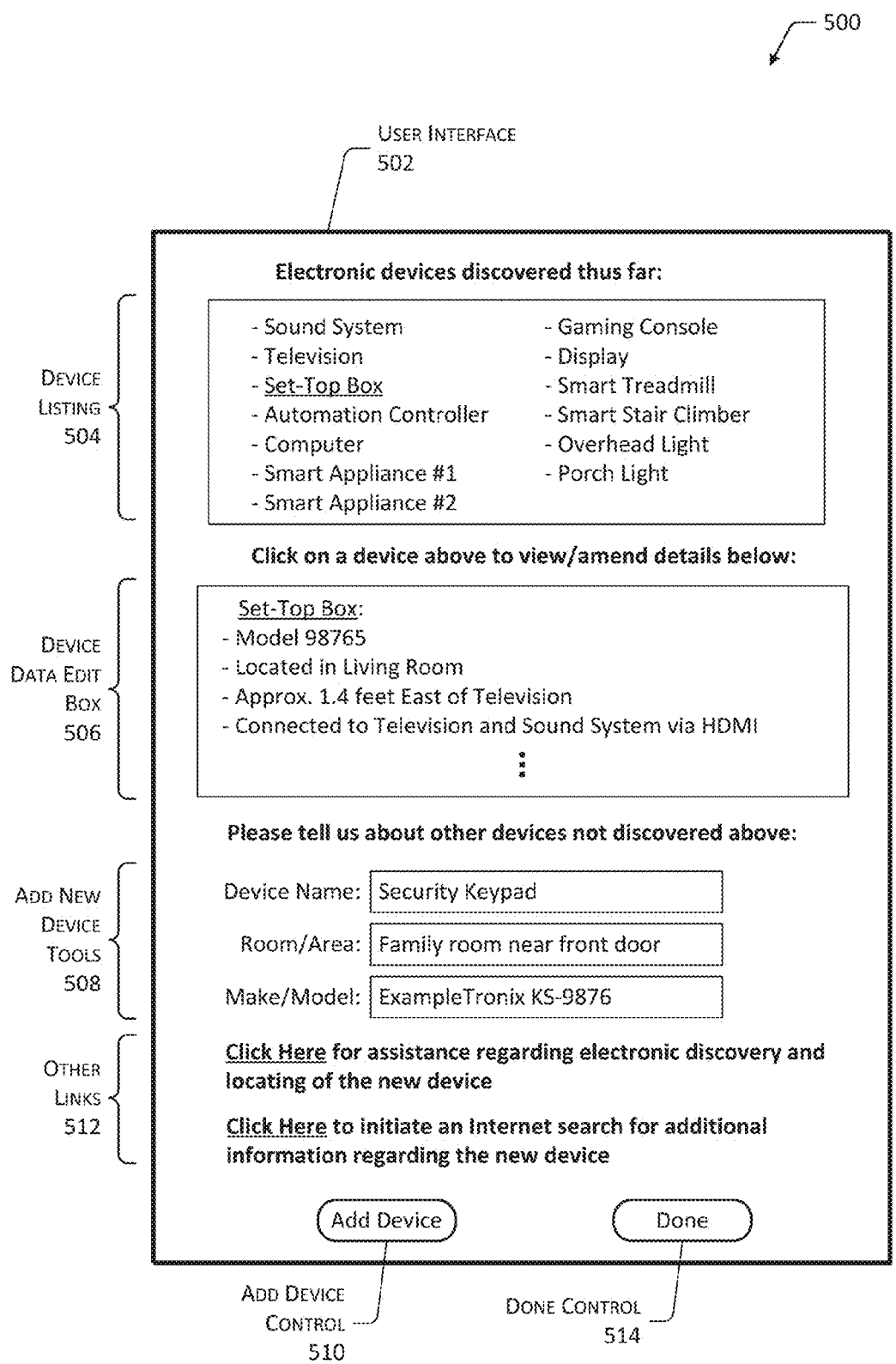
FIG. 5 depicts views including a user interface for representing device data regarding electronic devices, and tools and other features for amending or adding to that device data.

FIG. 5 depicts views 500 of a user interface 502 corresponding to device data 146. The user interface 502 may be presented, for instance, by way of the computing device 102. The views 500 are non-limiting in nature, and other user interfaces, elements, process steps, items, or respective operations are also contemplated.

The user interface 502 may include a device listing 504. The device listing 504 includes identifiers or names for respective electronic devices 144 discovered or entered thus far, for which respective device data 146 is stored within the computing device 102 or the server 108. Thus, the device listing 504 provides an overview of the various electronic devices 144 that are known to be present within a dwelling unit, commercial space, and so on. The user 104 may select one of the electronic devices 144 shown in the device listing 504 by mouse click, touch-screen gesturing, or other user input to the computing device 102.

The user interface 502 may also include a device data edit box 506. The device data edit box 506 may access data, information or various details within device data 146 corresponding to a selected electronic device 144. As depicted, the user 104 has selected the set-top box 118 within the device listing 504, and corresponding details or other data are presented within the device data edit box 506. Such information may include a make or model number, information describing its location within a particular room or area, information regarding other electronic devices 144 that the selected entity is connected to, the communicational protocol used for such cooperative operations, and so forth. The device data edit box 506 may also be used to correct or amend data and information presented in regard to the selected electronic device 144.

For instance, the user 104 may determine that the presented model number for the set-top box 118 is in error, and provide corrections thereto by way of user input. In another instance, the user 104 may couple the set-top box 118 and the computer 122 together by way of Wi-Fi™ wireless signals, such that an application running on the computer 122 may be used to control various aspects of the set-top box 118, schedule television programs to be recorded by the set-top box 118, or other operations. The user 104 may then provide input describing the foregoing cooperative linkage by way of the device data edit box 506. Other device data 146 corrections, additions, deletions, or other operations may also be performed using the device data edit box 506, and stored in non-transitory CRSM.

The user interface 502 may also include add new device tools 508. As depicted, the add new device tools 508 may include data input boxes for acquiring information regarding an electronic device 144 that is not included in the device listing 504. The user 104 may then provide inputs to the respective input boxes, such as a Device Name, a Room or Area designation, a Make/Model indication, and so on. Other kinds of device data 146 may also be included or input by way of add new device tools 508. The add new device tools 508 may include suitable tools or devices that are defined or enabled by computer-executable program code, and actuated or operable by way of mouse manipulations, touch-screen gesturing, keyboard entry, or other suitable user input.

For example, the user 104 may manually input information regarding the security keypad 412, including a name or identifier, an indication of the room or area where the security keypad 412 is located, and make/model information. Once the user 104 is satisfied with the initial identification of the security keypad 412, an add device control 510 may be clicked or actuated such that the new information is added to the device data 146. In turn, an indication of the security keypad 412 may be added to the device listing 504, and the user 104 may thereafter edit, change, or add information corresponding thereto by way of the device data edit box 506. Other operations may also be performed.

The user interface 502 may further include other links 512. For instance, a link 512 may present user guidance information regarding electronic discovery or geolocating of a new electronic device 144. Another link 512 may initiate an Internet search for information regarding a new or selected electronic device 144. Actuating one of the links 512 may redirect the user 104 to another user interface, a website, or another resource hosted by the server 108, or accessible by way of the one or more networks 110. Other operations may also be performed or initiated by way of respective links 512 or similar devices. The user interface 502 may also include a done control 514 that closes the user interface 502 and redirects the user 104 to another user interface, triggers another application on the computing device 102, and so forth.

The user interface 502 is illustrative of any suitable number of user interfaces that may be used for the acquisition or amendment of device data 146, assisting a user 104 in the determining of respective device locations 204, and so on. Various other resources or techniques may also be used toward the discovery of electronic devices 144 within an area of interest, locating such electronic devices 144 in an absolute or relative frame of reference, and so forth.

Figure 6:
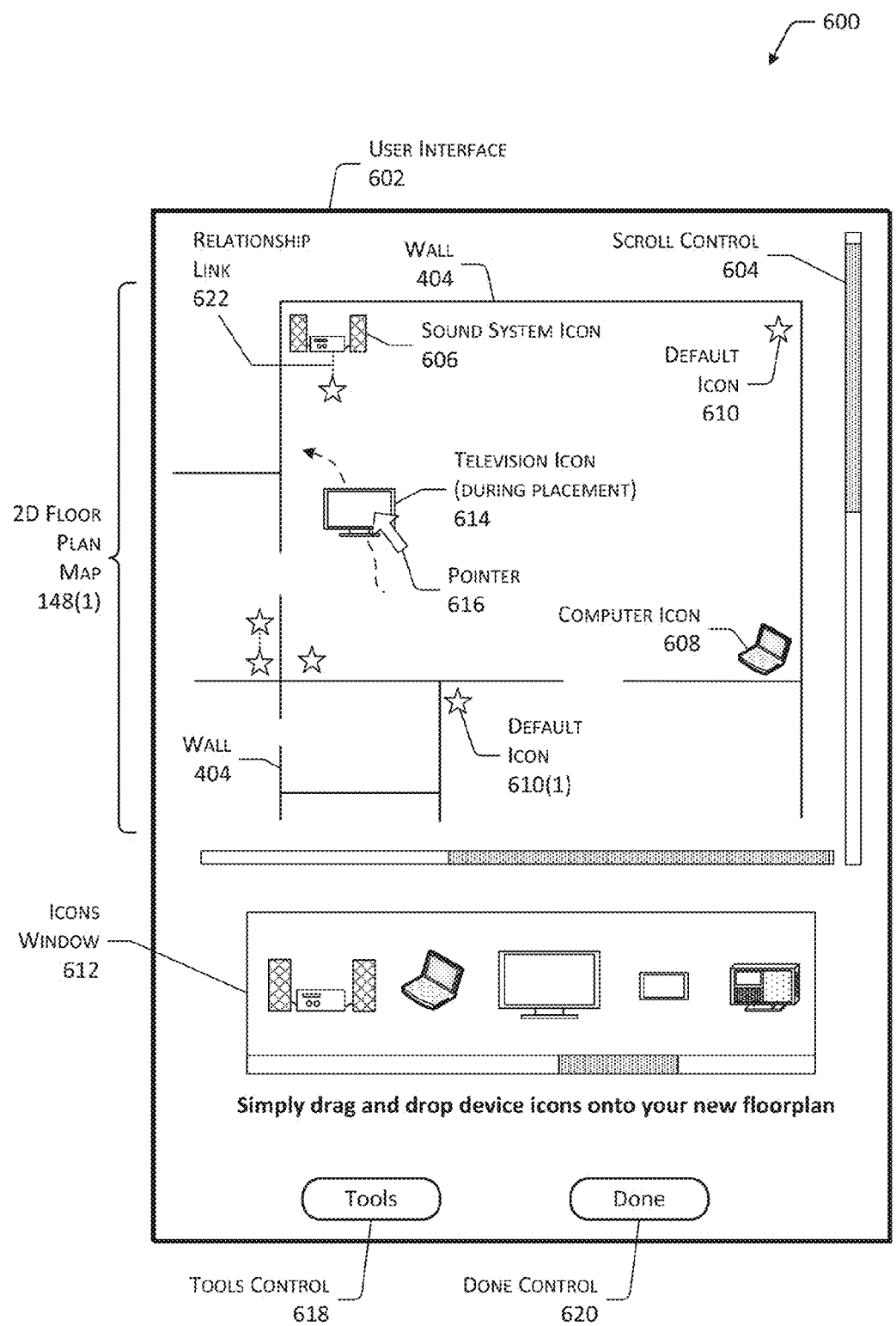
FIG. 6 depicts views including a user interface for representing a map, and tools and other features for amending or adding visible characteristics to that map.

FIG. 6 depicts views 600 of a user interface 602 directed to generating a 2D floor plan map 148(1). The user interface 602 may be presented, for instance, by way of the computing device 102. The views 600 are non-limiting in nature, and other user interfaces, elements, process steps, items, or respective operations are also contemplated.

The user interface 602 includes or presents a portion of the 2D floor plan map 148(1), which may be shifted or "panned" by way of one or more scroll controls 604 for viewing or other operations. The presentation of the 2D floor plan map 148(1)

also includes visible representations of walls 404 such that rooms or other characteristics of an area of interest are defined.

The 2D floor plan map 148(1) also includes a sound system icon 606 and a computer icon 608 that visibly represent the sound system 120 and the computer 122, respectively. The sound system icon 606 and the computer icon 608 have been placed within the presentation of the 2D floor plan map 148(1) in accordance with the device locations 204 for those respective electronic devices 144. The 2D floor plan map 148(1) also includes default icons 610 that visibly represent other electronic devices 144 whose respective locations 204 are known. For instance, the default icon 610(1) corresponds to the security sensor 414.

The user interface 602 also includes an icons window 612 that includes different, particular icons that may be selected for replacing default icons 610 within the 2D floor plan map 148(1). For instance, the sound system icon 606 and the computer icon 608 are among those icons presented within the icons window 612. Other icons may also be presented for selection and use within the icons window 612. The icons window 612 may include a scroll control 604 or other user interface element such that numerous different icons may be browsed.

The icons window 612 may be populated, in whole or in part, using digital photographs or rendered images obtained from the server 108, the Internet, or another resource coupled to the network(s) 110. In another case, one or more of the respective icons may be acquired directly from a corresponding electronic device 144 during discovery. In yet another instance, digital photographs of respective electronic devices 144 may be taken using the computing device 102 or another imaging device, and imported, scaled, or otherwise processed for inclusion as icons within the icons window 612. Other suitable operations may also be performed.

A television icon 614 is also depicted in the process of being placed within the presentation of the 2D floor plan map 148(1). For instance, the user 104 may provide input or gesturing such that a pointer 616 is controllably moved about within the user interface 602. The user 104 may position the pointer 616 over the television icon 614 within the icons window 612, and then provide input or gesturing so as to select the television icon 614 for placement. The user 104 may then move the pointer 616 so as to locate the television icon 614 by way of drag-and-drop operation. Similar operations may also be performed for selection and placement of other icons.

In another instance, the user 104 may manipulate the pointer 616 so as to dwell or hover over a particular default icon 610, causing the user interface 602 to present data regarding the corresponding electronic device 144. For example, the pointer 616 may be brought to hover over the default icon 610(1) such that an identifier for the corresponding security sensor 414 is presented. The user 104 may then click on the default icon 610(1) indicating selection thereof, and then move the pointer 616 so as to hover over a particular icon within the icons window 612. Clicking on the particular icon may then cause the default icon 610(1) to be replaced with the selected icon, without performing a drag-and-drop operation. Other icon selection or placement operations may also be performed.

The user interface 602 may also include various tools or soft switches used during generation or amending of the 2D floor plan map 148(1). As depicted, a tools control 618 may be configured to cause various drawing tools, erasing or amending tools, or other elements of a user interface to be presented such that the user 104 may change or enhance the visible presentation of the 2D floor plan map 148(1) or characteristics thereof. For instance, features such as walls 404, furniture, light fixtures, doorways or other architectural features, or other visible objects may be added to the 2D floor plan map 148(1) accordingly. Thus, the map 148(1) may be changed in accordance with numerous tools or techniques, and the resulting changed map 148 may be stored in non-transitory CRSM thereafter. The user interface 602 may also include a done control 620 that closes the user interface 602 and redirects the user 104 to another user interface, triggers another application on the computing device 102, and so forth.

Non-limiting examples of such tools may include line or shape drawing tools, a color selection grid, an object sizing tool, an object deleting tool, a text generation or editing tool, and so forth. Other suitable tools as defined or enabled by computer-executable program code may also be used. Such tools may be actuated or operated by way of computer mouse manipulations, touch-screen gesturing, or other use of a user interface element.

The user interface 602 is illustrative of any suitable number of user interfaces that may be used toward the generation or amendment of various maps 148, and so on. Various user interface elements or techniques may also be used toward the visible representation of electronic devices 144 within an area of interest in a graphic and intuitive manner. Other information regarding the electronic devices 144 may also be included or visibly depicted.

For instance, a relationship link 622 may be presented between the sound system icon 606 and the default icon 610 corresponding to the set-top box 118, in accordance with one or more cooperative operations that are performable between these respective entities. The presented relationship link 622 provides a graphical indication of the cooperative operation. In another instance, the user 104 may position the pointer 616 over a particular icon, such as the sound system icon 606 or the television icon 614, and click on that icon resulting in a presentation of the corresponding device data 146 within a dialog box or other device. In yet another instance, the user 104 may click on a particular icon and thereafter input a name such as "Tommy's Computer" or other information for the corresponding electronic device 144. Other operations by way of the user interface 602 or another analogous user interface may also be performed.

Figure 7:
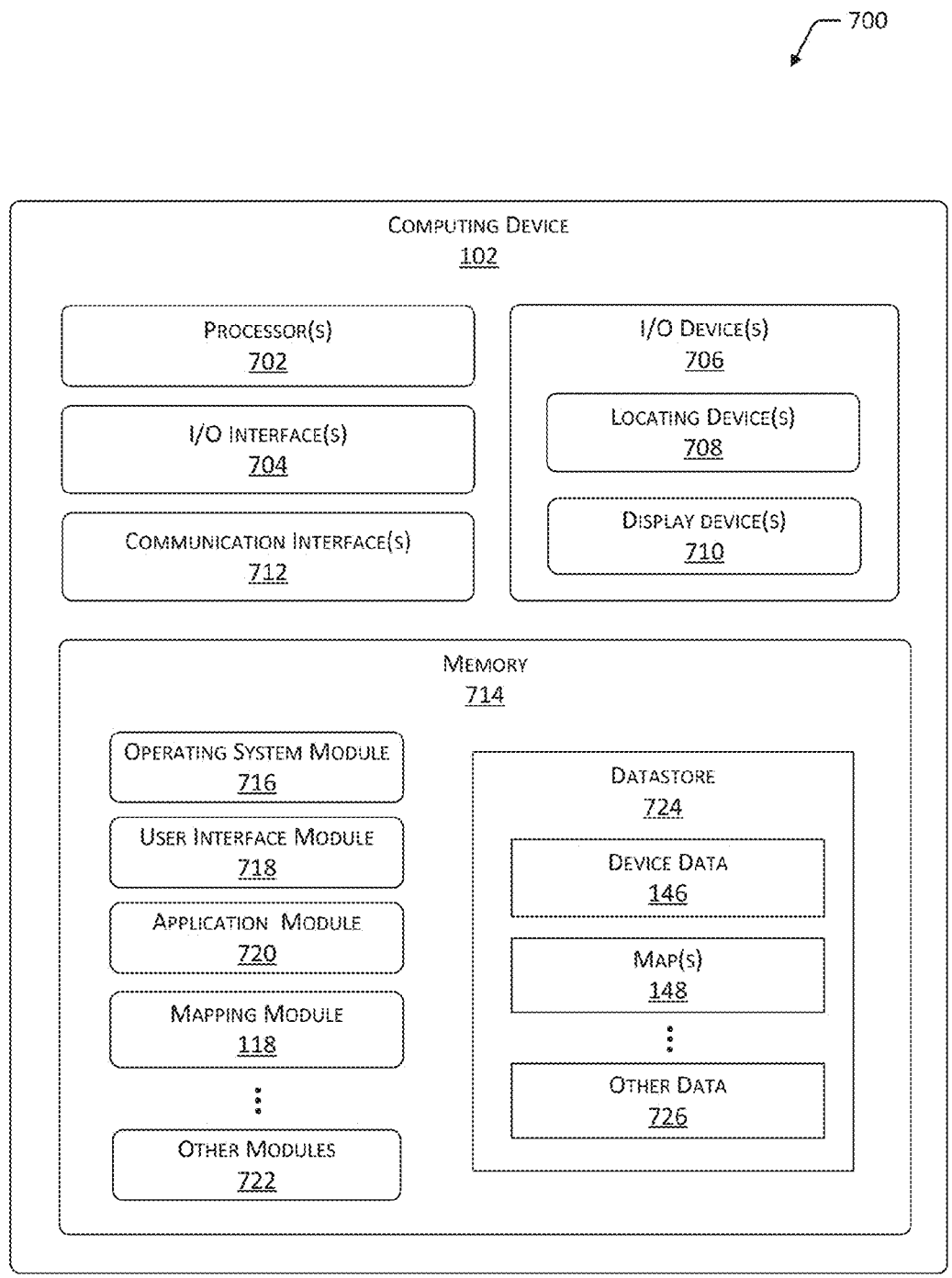
FIG. 7 is a block diagram depicting a computing device.

FIG. 7 illustrates a block diagram 700 of a computing device 102. The computing device 102 is illustrative and non-limiting, and may be defined by a tablet computer, a desktop computer, a wearable computer, an e-book reader, a media device, a smart phone, a laptop computer, or another suitable apparatus. The computing device 102 may include one or more processors 702 configured to execute one or more stored instructions. The processor(s) 702 may comprise one or more cores, and may also be referred to as hardware processors.

The computing device 102 may include one or more I/O interface(s) 704 to allow the processor(s) 702 or other portions of the computing device 102 to communicate with various other computing devices 102, other devices, the server 108, web-based resources, and so on. The I/O interfaces 704 may comprise I2C, SPI, USB, RS-232, and so forth.

The I/O interface(s) 704 may couple to one or more I/O devices 706. The I/O devices 706 may include one or more input devices such as a keyboard, a touch sensor, a mouse, a microphone, a digital camera, user input buttons, and so forth. The I/O devices 706 may also include one or more locating devices 708, such as a GPS receiver or another satellite-based positioning device, an inertial locating device, a cellular signal locating or geolocating system, optical positioning system, acoustic positioning system, or another suitable device or apparatus. One or more of the locating devices 708 may operate to determine a location of the computing device 102 using a plurality of radio signals transmitted from respective remote entities such as satellites, cellular towers, radio navigation beacons, or other suitable sources.

The I/O devices 706 may also include output devices such as one or more display devices 710, audio speakers, haptic output devices, and so forth. For example, the display devices 710 may include liquid crystal displays, electrophoretic displays, interferometric displays, and so forth which are configured to present an image to the user 104. In some embodiments, the I/O devices 706 may be physically incorporated within the computing device 102, or they may be externally placed. The I/O devices 706 may include various other devices, as well.

The computing device 102 may also include one or more communication interfaces 712. The communication interfaces 712 are configured to provide communications with other computing devices 102, web-based resources, servers 108, routers, wireless access points, and so forth. The communication interfaces 712 may include wireless functions, devices configured to couple to one or more networks including personal area networks (PANs), local area networks (LANs), Wireless-LANs (WLANs), wide area networks (WANs), and so forth. The computing device 102 may also include one or more busses or other internal communications hardware or software that allow for the transfer of data between the various modules and components of the computing device 102.

The computing device 102 includes one or more memories 714. The memory 714 comprises one or more non-transitory computer-readable storage media (CRSM). The memory 714 provides storage of computer readable instructions, data structures, program modules, and other data used during the operation of the computing device 102. The memory 714 may include at least one operating system (OS) module 716. Respective OS modules 716 are configured to manage hardware devices such as the I/O interfaces 704, the I/O devices 706, the communication interfaces 712, and provide various services to applications or modules executing on the processors 702.

Also stored in the memory 714 may be one or more of the following modules. These modules may be executed as foreground applications, background tasks, and so forth. A user interface module 718 may be configured to provide one or more user interfaces 502 or 602, and may also provide one or more application programming interfaces. The user interface module 718 may be configured to operate with information encoded as hypertext markup language ("HTML") files, extensible markup language ("XML") files, or in another suitable format or language. The user interface module 718 is configured to accept inputs and send outputs using the I/O interfaces 704, the communication interfaces 712, or both.

The memory 714 may also store one or more of the application modules 720. Non-limiting examples of the application modules 720 include a word processing application, a spreadsheet application, a technical drawing or illustrating application, a photo editing application, a web browsing application, a portable document viewing application, and so on. The memory 714 may also include the mapping module 106 as described elsewhere herein.

The memory 714 may also include one or more other modules 722. Non-limiting examples of the other modules 722 may include cellular communications resources, a watchdog or other timer, a wireless internet transceiver, resources for satellite communications or navigation, and so forth.

The memory 714 may also include a datastore 724 to store information. The datastore 724 may use a flat file, database, linked list, tree, executable code, one or more data tables, or another data structure or structures to store the information. In some implementations, the datastore 724 or a portion of the datastore 724 may be distributed across one or more other computing devices 102 or computing apparatus including servers 108, network attached storage apparatus, and so forth.

The datastore 724 may store device data 146 corresponding to one or more electronic devices 144, as respectively described elsewhere herein. The datastore 724 may also store one or more maps 148. The datastore 724 may also store other data 726. For example, the other data 726 may include one or more data structures that may be queried, modified, amended, and so forth. The other data 726 may also include encryption keys or codes used to access a server or servers 108, or when communicating with network-based resources, and so forth. Accordingly, respective computing devices 102 may be resourced and configured to perform numerous functions, as well as to cooperate with one or more other systems or apparatus.

Figure 8:
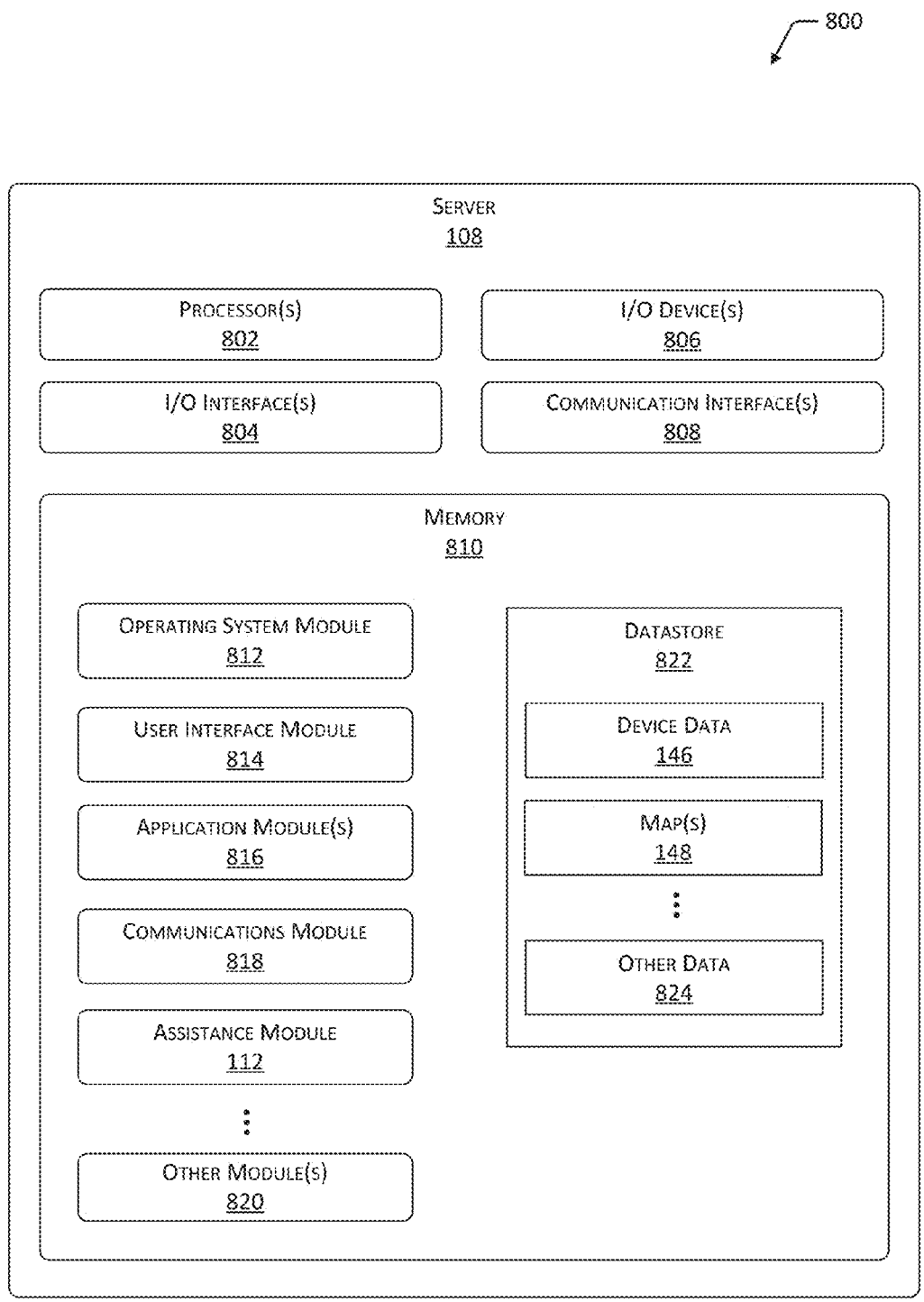
FIG. 8 is a block diagram depicting a server.

FIG. 8 illustrates a block diagram 800 of a server 108. The server 108 is illustrative and non-limiting, and may be defined by a rack-mounted server or another suitable apparatus. The server 108 may include one or more processors 802 configured to execute one or more stored instructions. The processor(s) 802 may comprise one or more cores, and may also be referred to as hardware processors.

The server 108 may include one or more I/O interface(s) 804 to allow the processor(s) 802 or other portions of the server 108 to communicate with various computing devices 102, other servers 108, computing apparatus or systems, web-based resources, and so on. The I/O interfaces 804 may comprise I2C, SPI, USB, RS-232, and so forth.

The I/O interface(s) 804 may couple to one or more I/O devices 806. The I/O devices 806 may include one or more input devices such as a keyboard, a mouse, a microphone, a camera, user input buttons, and so forth. The I/O devices 806 may also include output devices such as one or more displays, audio speakers, haptic output devices, and so forth. In some embodiments, the I/O devices 806 may be physically incorporated within the server 108, or they may be externally placed.

The server 108 may also include one or more communication interfaces 808. The communication interfaces 808 are configured to provide communications with other servers 108, various computing devices 102, web-based resources, routers, wireless access points, and so forth. The communication interfaces 808 may include wireless functions, devices configured to couple to one or more networks including LANs, Wireless-LANs, WANs, and so forth. The server 108 may also include one or more busses or other internal communications hardware or software that allow for the transfer of data between the various modules and components of the server 108.

The server 108 includes one or more memories 810. The memory 810 comprises one or more non-transitory CRSM. The memory 810 provides storage of computer readable instructions, data structures, program modules, and other data for the operation of the server 108. The memory 810 may include at least one operating system (OS) module 812. Respective OS modules 812 are configured to manage hardware devices such as the I/O interfaces 804, the I/O devices 806, the communication interfaces 808, and provide various services to applications or modules executing on the processors 802.

Also stored in the memory 810 may be one or more of the following modules. These modules may be executed as foreground applications, background tasks, and so forth. A user interface module 814 may be configured to provide one or more user interfaces 502 or 602. The user interface module 814 may also provide one or more application programming interfaces. The user interface module 814 may be configured to operate with information encoded as hypertext markup language ("HTML") files, extensible markup language ("XML") files, or in another suitable format or language. The user interface module 814 is configured to accept inputs and send outputs using the I/O interfaces 804, the communication interfaces 808, or both.

The memory 810 may also store one or more application modules 816. Non-limiting examples of the application modules 816 include a word processing application, a data encrypting or decrypting application, a data structure generation or management application, a web browsing application, a portable document generating or viewing application, and so on.

The memory 810 may further store a communications module 818 such that device data 146, respective maps 148, or other data, may be communicated to and from respective computing devices 102. In one example, the communications module 818 includes executable program code, electronic circuitry, or other resources used to transmit and receive wireless signals, signals by way of wired or optical pathways, or in accordance with other techniques. The memory 810 may also store the assistance module 112 as described elsewhere herein.

The memory 810 may also include one or more other modules 820. Non-limiting examples of the other modules 820 may include cellular communications circuitry, a watchdog or other timer, a wireless internet receiver, secured data handling or communications resources, and so forth.

The memory 810 may also include a datastore 822 to store information. The datastore 822 may use a flat file, database, linked list, tree, executable code, one or more data tables, or another data structure or structures to store the information. In some implementations, the datastore 822 or a portion of the datastore 822 may be distributed across one or more other servers 108 or computing devices, network attached storage apparatus, and so forth.

The datastore 822 may store device data 146, or one or more maps 148, or both, as respectively described elsewhere herein. Additionally, the datastore 822 may further store other data 824. For example, the other data 824 may include one or more data structures that may be queried, modified, amended, and so forth.

In one instance, the server 108 may be configured to access online resources, such as county auditor property records, and use such information toward generating or augmenting one or more of the maps 148. Thus, such Internet-based resources may provide information used to generate floor plans or other plots, and so forth. Additionally, the server 108 may be further configured to solicit user 104 permissions before accessing or using information or data acquired by online resources.

Figure 9:
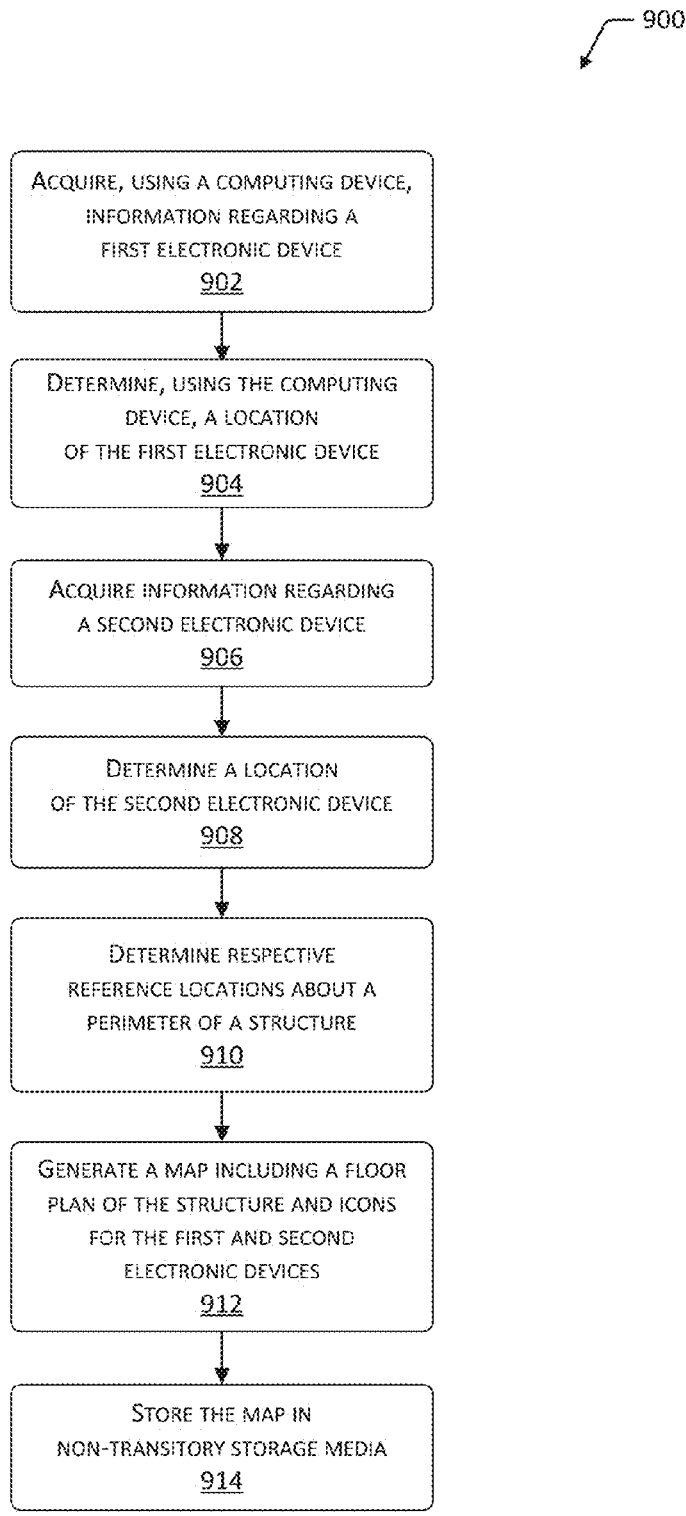
FIG. 9 is a flow diagram of an illustrative process including determining locations for first and second electronic devices, and generating a map representing those electronic devices.

FIG. 9 is a flow diagram 900 illustrating a process including acquiring device data 146 corresponding to electronic devices 144 and generating a corresponding map 148. The process of the flow diagram 900 is illustrative and non-limiting, and other processes including one or more other steps, omitting one or more of the depicted steps, or proceeding in other orders of execution, may also be used.

Block 902 acquires, using a computing device 102, information regarding a first electronic device 144. For purposes of a present illustration, the user 104 operates the computing device 102 so as to communicate with the automation controller 126 by way of wireless signals 206. The automation controller 126 is one of a several electronic devices 144 located in or about a home of the user 104, wherein the home has numerous rooms such as a living room 114, a kitchen 134, and so on.

The computing device 102 then acquires device data 146 from the automation controller 126, such as make or model data, information regarding various communicational protocols that the automation controller 126 is configured to use, and so forth. Other kinds of device data 146 may also be acquired. The device data 146 corresponding to the automation controller 126 may then be stored in non-transitory CRSM of the computing device 102.

Block 904 determines, using the computing device 102, a location 204 of the first electronic device 144. In the present example, the user 104 uses a locating device 708, such as a GPS receiver or inertial locator, of the computing device 102 to determine a device location 204 of the automation controller 126. Specifically, the user 104 places the computing device 102 proximate to the automation controller 126 and provides user input triggering the determination of the device location 204. The device location 204 may include latitude, longitude, or elevation data, a location relative to a reference point, or other suitable data. The device location 204 of the automation controller 126 may then be stored in non-transitory CRSM of the computing device 102.

Block 906 acquires information regarding a second electronic device 144. In the present example, the user 104 moves to a location near to the computer 122, and establishes communication between the computer 122 and the computing device 102 by way of wireless signals 206. Device data 146 is then acquired from the computer 122, and may include make or model information, identification of one or more applications runnable by the computer 122, various communicational modes or protocols, or other data corresponding to the computer 122. Device data 146 corresponding to the computer 122 may then be stored in non-transitory CRSM of the computing device 102.

Block 908 determines a location of the second electronic device 144. In the present example, the user 104 places the computing device 102 proximate to the computer 122 and triggers the location determination function. The determined device location 204 may include latitude/longitude/elevation data, a location relative to a reference point, or other suitable data. The device location 204 of the computer 122 may then be stored in non-transitory CRSM of the computing device 102.

Block 910 determines locations of respective benchmarks 420 about a perimeter of a structure. In the present example, the user 104 may carry the computing device 102 to a point of interest outside of their home, such as a corner or apex defined by respective exterior walls 404. The user 104 then uses a locating device 708 of the computing device 102 to determine a location of that point of interest, thus defining a reference location 420. For instance, the locating device 708 may be a GPS receiver or other satellite-based positioning device, an inertial locating system, a cellular positioning or triangulation device, and so on.

The user 104 may then proceed on to other points of interest, using the computing device 102 to determine other respective reference locations 420. The location data for the respective reference locations 420 may be formatted or quantified in any suitable units of measure, and may be stored within non-transitory CRSM of the computing device 102.

Block 912 generates a map 148 including a floor plan of the structure and icons for the first and second electronic devices 144. In the present example, the mapping module 106 may access information stored within CRSM of the computing device 102, including the respective device locations 204 and the reference locations 420. The mapping module may also access device data 146 corresponding to the computer 122 and the automation controller 126. The mapping module 106 may then use these respective data to generate a 2D floor plan map 148(1).

The 2D floor plan map 148(1) may include, among other things, visible representations for exterior walls 404 based upon the reference locations 420. The 2D floor plan map 148(1) may also include respective default icons 610 corresponding to the computer 122 and the automation controller 126. The user interface 602 may thereafter be used so as to add or edit various visible characteristics of the 2D floor plan map 148(1), plot doorways, furniture, or windows, adjust the plotted positions of the default icons 610 for the computer 122 and the automation controller 126, and so forth. Thus, the user 104 may amend or enhance the appearance of visible presentations of the 2D floor plan map 148(1) in accordance with various computer-aided techniques.

Block 914 stores the map 148 in non-transitory storage media. In the present example, the user 104 may actuate a done control 620, causing the user interface 602 to close and the computing device 102 to save the generated and (potentially) edited 2D floor plan map 148(1) within non-transitory memory 714. The user 104 may now access the 2D floor plan map 148(1) at a later time, view a presentation of the 2D floor plan map 148(1) while accessing or learning about different functions or cooperative operations performable by the respective electronic devices 144, and so on.

Figure 10:
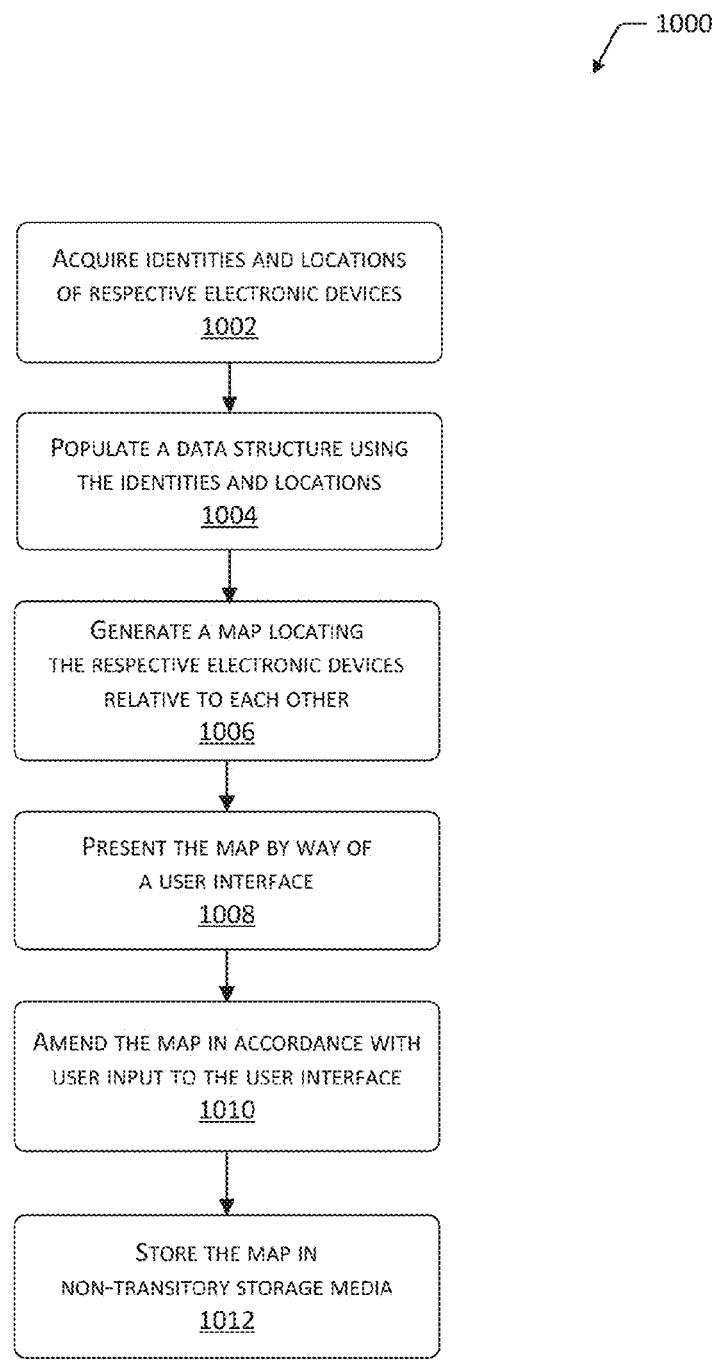
FIG. 10 is a flow diagram of an illustrative process including generating a map and amending the contents of that map by way of a user interface.

FIG. 10 is a flow diagram 1000 illustrating a process including generating a map 148, and amending the map 148 by way of user interface 602. The process of the flow diagram 1000 is illustrative and non-limiting, and other processes including one or more other steps, omitting one or more of the depicted steps, or proceeding in other orders of execution, may also be used.

Block 1002 acquires identities and locations of respective electronic devices 144. For purposes of a present example, the user 104 moves about within a living room 114 of their home, using the computing device 102 to determine a device location 204(3) of a television 116, a device location 204(4) of a set-top box 118, and a device location 204(2) of a sound system 120. Additionally, the user 104 manually enters identifiers or other device data 146 for the television 116, the set-top box 118, and the sound system 120 by way of a user interface 502.

Block 1004 populates a data structure using the identities and locations of the electronic devices 144. In the present example, the device data and the respective device locations 204(2)-204(4), are stored as a data table within non-transitory CRSM of the computing device 102.

Block 1006 generates a map 148 locating the respective electronic devices 144 relative to each other. In the present example, the mapping module 106 accesses the device data 146 and the device locations 204(2)-204(4) within CRSM and generates data describing a 2D floor plan map 148(1). As such, location data is determined or derived for the television 116, the set-top box 118, and the sound system 120, respectively. Relative locations for these three electronic devices 144 within the map may be determined or estimated in accordance with the device locations 204(2)-204(4).

Block 1008 presents the map 148 by way of a user interface 602. In the present example, the mapping module presents the current instance of the 2D floor plan map 148(1) by way of the user interface 602. As such, the user 104 may scroll or pan so as to view respective areas of the 2D floor plan map 148(1), and so forth. The 2D floor plan map 148(1) includes default icons 610 visibly representing the television 116, the set-top box 118, and the sound system 120, respectively.

Block 1010 amends the map 148 in accordance with user input to the user interface 602. In the present example, the user 104 moves a pointer 616 by way of manipulating a computer mouse, touch-screen gesturing, or other input technique so as to select the sound system icon 606 from within the icons window 612. The user 104 then places the sound system icon 606 so as to replace the default icon 610 corresponding to the sound system 120 within the 2D floor plan map 148(1).

Analogous operations may also be performed, replacing the default icons 610 representing the television 116, the set-top box 118, respectively. Thus, the user 104 may enhance the appearance of a visible presentation of the 2D floor plan map 148(1) by way of intuitive-looking representations of real-world electronic devices 144. The user 104 may operate or use other tools presented by the user interface 602 to add representations of walls 404, define doorways, and so forth, so as to improve the appearance and usefulness of the 2D floor plan map 148(1).

Block 1012 stores the map 148 in non-transitory storage media. In the present example, the user 104 actuates a done control 620, causing the computing device 102 to store the changed version of the 2D floor plan map 148(1) within the memory 714. The computing device 102 also closes the user interface 602 and returns the user 104 to another application or user interface. Other suitable closing operations may also be performed.

Figure 11:
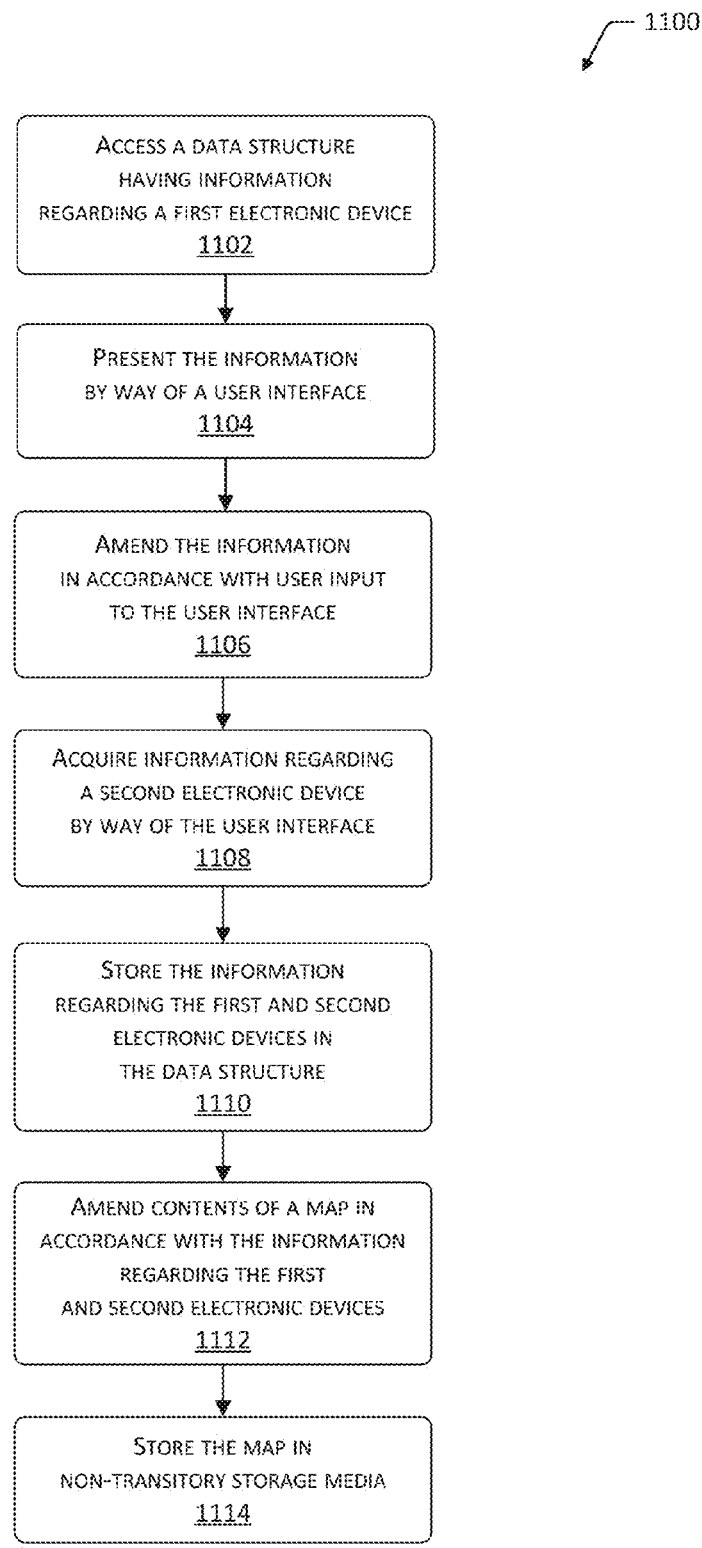
FIG. 11 is a flow diagram of an illustrative process including acquiring device data for respective electronic devices and amending contents of a map based upon that device data.

FIG. 11 is a flow diagram 1100 illustrating a process including amending information regarding electronic devices 144 by way of a user interface 502, and then amending a map 148 based on the changed information. The process of the flow diagram 1100 is illustrative and non-limiting, and other processes including one or more other steps, omitting one or more of the depicted steps, or proceeding in other orders of execution, may also be used.

Block 1102 accesses a data structure having information regarding a first electronic device 144. For purposes of a present example, the mapping module 106 of the computing device 102 accesses device data 146 corresponding to various electronic devices 144 within an area of interest, such as a home. Such an operation may be triggered, for instance, by a user 104 seeking to view information regarding the television 116.

Block 1104 presents the information by way of a user interface 502. In the present example, the user interface 502 is displayed by the computing device 102. The user interface 502 cites to, or includes an identifier referring to, the television 116 within the device listing 504. The user 104 may select the television 116 within the device listing 504, causing corresponding device data 146 to appear within the device data edit box 506. Thus, the user 104 may view information or characteristics regarding the television 116, including manufacturer, model or model number, communicational modes or protocols, connections or cooperative operations performed with other electronic devices 144, and so on.

Block 1106 amends the information in accordance with user input to the user interface 502. In the present example, the user 104 is aware that the television 116 is connected to receive digital audio and video signaling from the set-top box 118 by way of an HDMI-protocol wired connection, but that such information is lacking from the presented device data 146. The user 104 then provides input to the user interface 502 indicative of the HDMI connection between the television 116 and the set-top box 118. The corresponding device data 146 is updated in accordance with the user 104 input.

Device data 146 regarding the set-top box 118 may be similarly changed by way of automatic operation of the mapping module 106—that is, without deliberate action or awareness of the user 104. The amended device data 146 regarding the television 116, and possibly the set-top box 118, may then be stored in non-transitory memory 714 of the computing device 102.

Block 1108 acquires information regarding a second electronic device 144 by way of the user interface 502. In the present example, the user 104 notes that the sound system 120 does not appear within the device listing 504. The user 104 then inputs information regarding the sound system 120 by way of input boxes, selectable options, pull-down menus, or other tools provided within the add new device tools 508 section of user interface 502.

Block 1110 stores the information regarding the first and second electronic devices 144 in the data structure. In the present example, the user 104 may actuate a done control 620 within the user interface 602, causing the just-amended device data 146 to be stored within the memory 714 of the computing device 102.

Block 1112 amends the contents of a map 148 in accordance with the information regarding the first and second electronic devices 144. In the present example, the mapping module 106 accesses the device data 146 as stored within the memory 714. The mapping module 106 may then access the device data 146 and use recently changed or added information to amend the 2D floor plan map 148(1) accordingly. That is, a changed map 148(1) may be generated or stored using the changed or amended device data 146.

For instance, a connection between the television 116 and the set-top box 118 may be visibly added in accordance with the user 104 input at block 1106 above. Additionally, a default icon 610 representative of the sound system 120 may be added to the 2D floor plan map 148(1) in accordance with the user 104 input at block 1108 above. Other changes or additions to the 2D floor plan map 148(1) may also be made according to the device data 146.

Block 1114 stores the map 148 in non-transitory storage media. In the present example, the mapping module 106 may then store the amended or changed version of the 2D floor plan map 148(1) within memory 714 of the computing device 102. In this way, changes to an existing map 148 may be made in accordance with user 104 corrections or additions to device data 146 corresponding to electronic devices 144 plotted within the map 148.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A method performed by a hardware processor, the method comprising:
   determining first location data indicative of a location of a first electronic device within an area;
   determining second location data indicative of a location of a feature within the area, wherein the feature comprises furniture or an architectural element;
   determining third location data indicative of a location of a second electronic device within the area;
   identifying a cooperative operation that is performable between the first electronic device and the second electronic device;
   generating, using the first location data, the second location data and the third location data, a map comprising data indicative of a relative location of the first electronic device, the second electronic device and the feature;
   displaying, on the map, a graphical representation of the cooperative operation performable between the first electronic device and the second electronic device;
   storing the map;
   generating a presentation of the map, the presentation comprising graphical elements representative of the first electronic device, the second location data and the feature; and
   displaying the presentation of the map by way of a display device.

2. The method of claim 1, wherein:
   the first location data is determined using a locating device in communication with the hardware processor; and
   the locating device uses a plurality of radio signals transmitted from respective remote entities to determine a location.

3. The method of claim 1, the determining the first location data and the second location data comprising:
   illuminating at least a portion of the area with light with a scanning apparatus;
   detecting one or more of reflected light or fluoresced light from physical objects in the area;

determining a distance between the scanning apparatus and the physical objects using one or more of time-of-flight, intensity of detected light, or interferometry;

determining a position of the physical objects using orientation of the scanning apparatus during illumination and detection; and generating the first location data and the second location data using the determined distance and the position.

4. The method of claim 1, the determining the first location data and the second location data comprising:

generating one or more digital images of the area using an imaging device in communication with the hardware processor;

identifying, using an object recognition resource, the first electronic device, the second electronic device and the feature within one or more of the digital images;

determining respective spatial locations of the first electronic device, the second electronic device and the feature within the area using the one or more digital images;

determining one or more distances between the first electronic device, the second electronic device and the feature within the area using the one or more digital images; and determining the first location data and the second location data using the spatial locations and the distances.

5. The method of claim 1, the determining the first location data comprising:

determining, using a locating resource of the first electronic device, a location of the electronic device;

communicating information indicative of the determined location from the first electronic device to the hardware processor using wireless signals; and determining the first location data using the information.

6. The method of claim 1, further comprising:

presenting, using the display device, a user interface including information corresponding to the first electronic device;

receiving, at the user interface, input descriptive of the first electronic device;

generating a changed map in accordance with the input; and storing the changed map.

7. The method of claim 1, wherein the feature is a first feature, the method further comprising:

presenting, using the display device, a user interface tool;

generating, using input to the user interface tool, data corresponding to a second feature within the area;

generating a changed map in accordance with the data corresponding to the second feature; and storing the changed map.

8. The method of claim 1, the method further comprising:

accessing data corresponding to respective characteristics of the first electronic device and the second electronic device, wherein the characteristics include one or more of respective manufacturers, or respective models of the first and second electronic devices;

determining the cooperative operation that is performable between the first electronic device and the second electronic device; and storing data corresponding to the cooperative operation.

9. The method of claim 1, further comprising:

acquiring, using communication between the first electronic device and a communications interface, data regarding the first electronic device, wherein the data regarding the first electronic device includes at least one of an identifier, a manufacturer, a model, or a communications protocol; and storing the data regarding the first electronic device.

10. The method of claim 1, wherein:

the area corresponds to a dwelling;

the map includes graphical elements representing one or more walls defining an interior of the dwelling; and the map includes the graphical elements representing the first electronic device plotted relative to the one or more walls.

11. The method of claim 1, wherein:

the map includes graphical elements representing the first electronic device and the second electronic device plotted relative to each other and relative to the graphical elements representing the one or more walls; and at least one of the graphical elements is acquired from a server using data regarding one of the first electronic device and the second electronic device.

12. The method of claim 1, wherein:

the map includes a three-dimensional representation of an interior space within the area;

the map includes rendered images of one or more walls or structural features; and the map includes a rendered image of the first electronic device plotted relative to the one or more walls or structural features.

13. The method of claim 1, further comprising:

determining, using a locating device in communication with the hardware processor, a plurality of reference locations along a perimeter of the area; and plotting, using the reference locations, the perimeter of the area within the map.

14. A system, comprising:

at least one memory storing computer-executable instructions; and at least one processor to access the at least one memory and execute the computer-executable instructions to:

determine first location data indicative of a location of a first electronic device within an area;

determine second location data indicative of a location of a feature within the area, wherein the feature comprises furniture or an architectural element;

determine third location data indicative of a location of a second electronic device within the area;

identify a cooperative operation that is performable between the first electronic device and the second electronic device;

generate, using the first location data, the second location data and the third location data, a map comprising data indicative of a relative location of the first electronic device, the second electronic device and the feature;

store the map; and present, on a display device, a presentation of the map comprising graphical elements representative of the first electronic device, the second location data and the feature.

15. The system of claim 14, further configured to:

illuminate at least a portion of the area with light with a scanning apparatus;

detect one or more of reflected light or fluoresced light from physical objects in the area;

determine a distance between the scanning apparatus and the physical objects using one or more of time-of-flight, intensity of detected light, or interferometry;

determine a position of the physical objects using orientation of the scanning apparatus during illumination and detection; and generate the first location data, the second location data and the third location data using the determined distance and the determined position.

16. The system of claim 14, further configured to:
present a user interface including one or more selectable icons representing different electronic devices;
receive, at the user interface, a selection of one of the one or more selectable icons; and
replace, within the map, a first icon with the selected one of the one or more icons.

17. A computing device, comprising:
at least one memory storing computer-executable instructions; and
at least one processor to access the at least one memory and execute the computer-executable instructions to:
  determine a location of a first electronic device within an area;
  determine a location of a feature within the area;
  determine a location of a second electronic device within the area;
  identify a cooperative operation that is performable between the first electronic device and the second electronic device;
  generate a map using the location of the first electronic device, the second electronic device and the location of the feature, the map comprising graphical elements defining the area, the graphical elements further including a representation of the first electronic device, the second electronic device and the feature plotted relative to the graphical elements defining the area; and
  display, on a display device, a presentation of the map comprising the graphical elements.

18. The computing device of claim 17, further configured to:
illuminate at least a portion of the area with light with a scanning apparatus;
detect one or more of reflected light or fluoresced light from physical objects in the area;
determine a distance between the scanning apparatus and the physical objects using one or more of time-of-flight, intensity of detected light, or interferometry;
determine a position of the physical objects using orientation of the scanning apparatus during illumination and detection; and
generate the location of the first electronic device, the location of the second electronic device and the location of the feature using the determined distance and the determined position.

19. The computing device of claim 17, further configured to:
present a user interface corresponding to the map, the user interface including a plurality of icons representing the one or more electronic devices;
receive, using the user interface, a selection of one of the electronic devices that represented in the map by one of the plurality of icons; and
replace, within the map, data indicative of a visible representation of the selected electronic device with the selected icon.

20. The computing device of claim 17, further configured to:
acquire, using the first locating device, respective locations of one or more electronic devices, wherein the first locating device is placed proximate to one or more of the one or more electronic devices, wherein input to the first locating device is received to trigger a locating technique for determining locations of the one or more electronic devices; and
store, within a non-transitory computer-readable storage media, data regarding the locations of the one or more electronic devices.

* * * * *